(12) United States Patent
Cragel et al.

(10) Patent No.: US 8,251,171 B2
(45) Date of Patent: Aug. 28, 2012

(54) LATTICE STRUCTURE FOR A DISTENSIBLE FUEL TANK

(75) Inventors: Daniel Frank Cragel, Livonia, MI (US); Russell Randall Pearce, Ann Arbor, MI (US); Patrick Sullivan, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 242 days.

(21) Appl. No.: 12/815,283

(22) Filed: Jun. 14, 2010

(65) Prior Publication Data

US 2011/0303684 A1 Dec. 15, 2011

(51) Int. Cl.
*B60K 15/03* (2006.01)
(52) U.S. Cl. ........................... 180/69.5; 220/652
(58) Field of Classification Search ............... 180/69.4, 180/69.5; 220/651, 652, 653; 428/105, 119, 428/152
See application file for complete search history.

(56) References Cited

U.S. PATENT DOCUMENTS

| | | | | |
|---|---|---|---|---|
| 2,144,945 | A * | 1/1939 | Sutton | 220/651 |
| 2,451,131 | A | 10/1948 | Vidal et al. | |
| 2,982,441 | A * | 5/1961 | Farrell et al. | 220/652 |
| 3,501,367 | A | 3/1970 | Parker | |
| 4,964,531 | A * | 10/1990 | Caniglia et al. | 220/501 |
| 5,647,933 | A | 7/1997 | Christensen | |
| 6,408,979 | B1 * | 6/2002 | Forbes et al. | 181/198 |
| 6,595,382 | B2 * | 7/2003 | Ettlinger | 220/560.11 |
| 7,111,750 | B2 * | 9/2006 | Gulati et al. | 220/560.04 |
| 7,541,085 | B2 | 6/2009 | Burdon | |
| 2002/0066737 | A1 | 6/2002 | Stack et al. | |

FOREIGN PATENT DOCUMENTS

JP 7-257493 A 10/1995

* cited by examiner

*Primary Examiner* — John Walters
(74) *Attorney, Agent, or Firm* — Julia Voutyras; Alleman Hall McCoy Russell & Tuttle LLP

(57) ABSTRACT

A distensible fuel tank included in a vehicle is provided. The fuel tank may include a housing enclosing a lattice structure including at least two intersecting wall members, each wall member including a plurality of panels arranged in a repeating pattern, the plurality of panels having planar sides including a compliance panel having a first and second section configured to fold about a crease line. In this way, multi-directional compliance of the fuel tank can be achieved, while increasing structural integrity.

20 Claims, 4 Drawing Sheets

LATTICE STRUCTURE FOR A DISTENSIBLE FUEL TANK

BACKGROUND/SUMMARY

Fuel tanks may experience increased pressure during certain operating conditions. The increased pressure may be caused by an increase in the temperature in a sealed fuel tank. The duration that a fuel tank is sealed may be increased in hybrid vehicles using both an electric motor and an internal combustion engine for motive power when compared to vehicles relying solely on internal combustion engines for motive power. The increase may be due, in part, to the sporadic use of the internal combustion engine in the hybrid vehicle. Consequently, the pressure in a fuel tank of a hybrid vehicle may reach levels that are many times greater than those experienced in systems where the fuel tank is routinely purged to the engine whenever necessary. In some circumstances the pressure in a fuel tank of a hybrid vehicle may be 15-20 times greater than the maximum values experienced by a fuel tank in a vehicle relying solely on an internal combustion engine for motive power.

To withstand increased pressure within the fuel tank thicker fuel tanks have been used, such as heavier gauge metal fuel tanks. However, the inventors herein have recognized various shortcomings of the above approach. For example, fuel tanks having increased wall thickness may not only increase vehicle costs but also increase the weight and size of the fuel tank. Moreover, the shape of the fuel tank housing may be selected based on the strength of the design rather than on the compactness of the design, decreasing the compactness of the vehicle or the fuel tank's storage capacity and therefore the driving range of the vehicle.

As such, various example systems and approaches are described herein. In one example, a distensible fuel tank included in a vehicle is provided. The fuel tank may include a housing enclosing a lattice structure substantially spanning a portion of an interior defined by the housing. The lattice structure may include at least two intersecting wall members, each wall member including a plurality of panels arranged in a repeating pattern, the plurality of panels having planar sides including a compliance panel having a first and second section configured to fold about a crease line.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

A fuel tank with an internal lattice structure is disclosed herein. In particular the fuel tank may include a housing enclosing a lattice structure substantially spanning a portion of an interior defined by the housing. The lattice structure may include at least two intersecting wall members, each wall member including a plurality of panels arranged in a repeating pattern, the plurality of panels having planar sides including a compliance panel having a first and second section configured to fold about a crease line. In this way, increased structural support may be provided to the fuel tank via an internal structure. The lattice structure may be used in a fuel tank having increased housing thickness to further enhance the fuel tank's strength or may be used in lieu of a housing having increased thickness. Moreover, the lattice structure may be customized for a variety of fuel tank geometries, enabling the lattice structure to be used in a wide range of vehicles, thereby increasing the applicability of the lattice structure.

Figure 1:
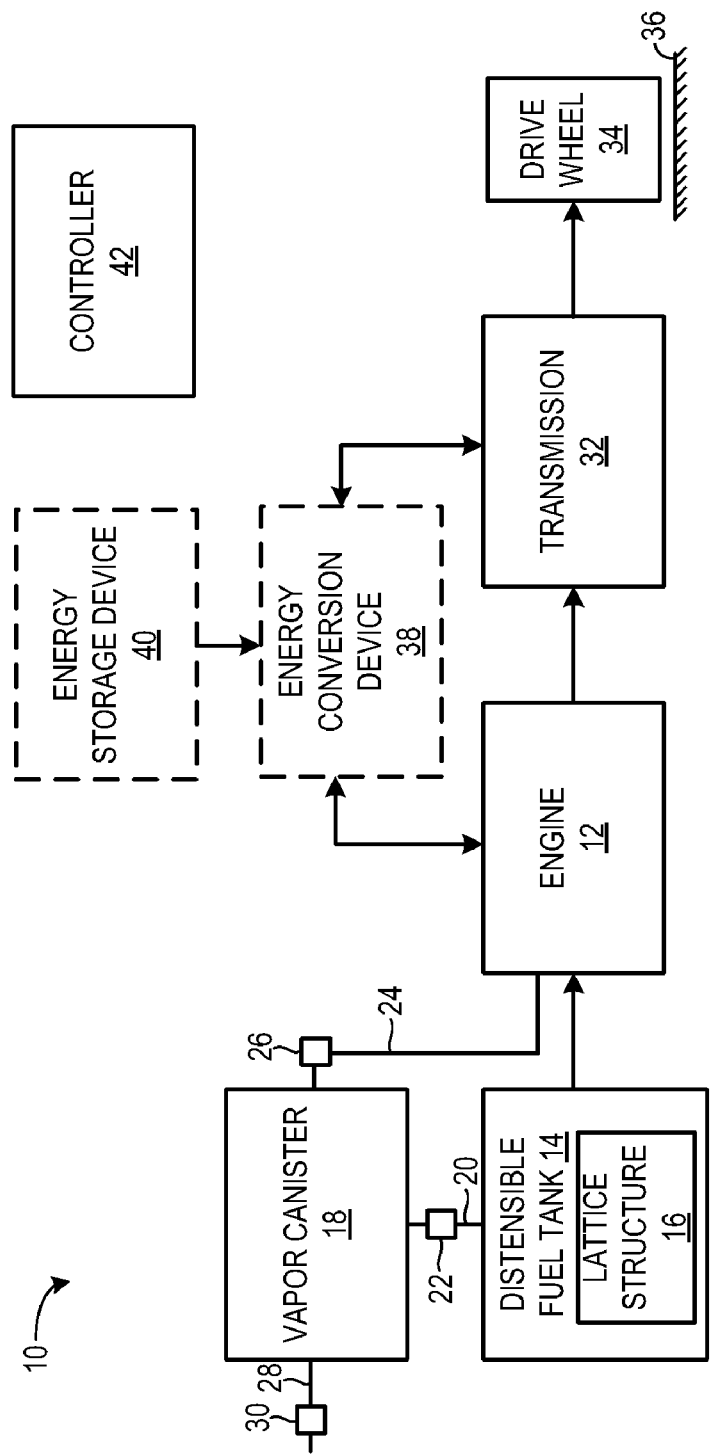
FIG. 1 shows a schematic depiction of a system in a vehicle including a distensible fuel tank having a lattice structure.

Referring to FIG. 1, a system 10 for a vehicle is shown. The system includes an internal combustion engine 12 coupled to a distensible fuel tank 14. The fuel tank may include a lattice structure 16 for providing increased structural integrity as well as a predetermined amount of compliance to the fuel tank, discussed in greater detail herein with regard to FIG. 3-6.

System 10 may further include a vapor canister 18. The vapor canister may be fluidly coupled to fuel tank 14 via a tank conduit 20 including a fuel tank isolation valve 22. The vapor canister may also be coupled to the engine via an engine conduit 24 including a canister purge valve 26. Furthermore, a vent conduit 28 including a canister vent valve 30 may be coupled to the vapor canister. The vent conduit may be in fluidic communication with the surrounding air.

It will be appreciated that the aforementioned valves (i.e., fuel tank isolation valve 22, canister purge valve 26, and canister vent valve 30) may be selectively operated to perform the following operations: vapor canister purging, fuel tank isolation, and refueling. Vapor canister purging operation may be performed when the internal combustion engine is in operation and a sufficient vacuum is generated in the engine's intake manifold. However, it will be appreciated that in certain vehicles, such as hybrid vehicles, the internal combustion engine may be sporadically operated during vehicle operation.

Continuing with FIG. 1, internal combustion engine 12 may also be coupled to a transmission 32. The transmission may be a manual transmission, automatic transmission, or combinations thereof. Further, various additional components may be included in the transmission, such as a torque converter, and/or other gears such as a final drive unit, etc. Transmission 32 is shown coupled to drive wheel 34, which in turn is in contact with road surface 36. Although a single drive wheel is depicted it will be appreciated that a plurality of drive wheels may be coupled to transmission 32.

In this example embodiment, system 10 also includes an energy conversion device 38, which may include a motor, a generator, among others and combinations thereof. Energy conversion device 38 is further shown coupled to an energy storage device 40, which may include a battery, a capacitor, a flywheel, a pressure vessel, etc. However in other embodiments system 10 may not include the energy conversion device and the energy storage device. Hence, in some embodiments the internal combustion engine may be the sole source of motive power in the vehicle.

Energy conversion device 38 can be operated to absorb energy from vehicle motion and/or the engine and convert the absorbed energy to an energy form suitable for storage by the energy storage device (i.e., provide a generator operation). The energy conversion device can also be operated to supply an output (power, work, torque, speed, etc.) to drive wheel 34 and/or engine 12 (i.e. provide a motor operation). It will be appreciated that the energy conversion device may, in some embodiments, include only a motor, only a generator, or both a motor and generator, among various other components used for providing the appropriate conversion of energy between the energy storage device and the drive wheel and/or engine.

The depicted connections between engine 12, energy conversion device 38, transmission 32, and drive wheel 34 indicate transmission of mechanical energy from one component to another, whereas the connections between the energy conversion device and the energy storage device may indicate transmission of a variety of energy forms such as electrical, mechanical, etc. For example, torque may be transmitted from engine 12 to drive the drive wheel 34 via transmission 32. As described above energy storage device 40 may be configured to operate in a generator mode and/or a motor mode. In a generator mode, energy conversion device 38 absorbs some or all of the output from engine 12 and/or transmission 32, which reduces the amount of drive output delivered to drive wheel 34, or the amount of braking torque to the drive wheel. Such operation may be employed, for example, to achieve efficiency gains through regenerative braking, improved engine efficiency, etc. Further, the output received by the energy conversion device may be used to charge energy storage device 40. In motor mode, the energy conversion device may supply mechanical output to engine 12 and/or transmission 32, for example by using electrical energy stored in an electric battery. In some examples, combustion cycles in the engine may be inhibited in motor mode.

Hybrid propulsion embodiments may include full hybrid systems, in which the vehicle can run on just the engine, just the energy conversion device (e.g. motor), or a combination of both. Assist or mild hybrid configurations may also be employed, in which the engine is the primary torque source, with the hybrid propulsion system acting to selectively deliver added torque, for example during tip-in or other conditions. Further still, starter/generator and/or smart alternator systems may also be used. The various components described above with reference to FIG. 1 may be controlled by a vehicle controller 42.

It will be appreciated that the vehicle controller may be configured to seal the fuel tank during certain operating conditions, such as when engine 12 is not providing motive power to the vehicle, to decrease evaporative emissions. For example, the vehicle may be operated in the motor mode in which the energy conversion device provides motive power to the vehicle and combustion cycles in the engine are substantially inhibited. Inhibiting combustion cycles in the engine may include inhibiting fuel injection events, inhibiting operation of the fuel delivery system pumps, and isolating the fuel delivery system. Isolation of the fuel tank may include substantially inhibiting fluidic communication with the fuel delivery system and the atmosphere. In other words, the fuel tank may be sealed. Furthermore it will be appreciated that operation of internal combustion engine 12 may be inhibited when the vehicle is travelling below a threshold speed or when the vehicle has not surpassed a threshold range corresponding to an amount of energy stored within the energy storage device. Therefore, when the vehicle is driven for a short duration or below a threshold speed, the fuel tank may be sealed. During the aforementioned conditions fluctuations in temperature may cause the pressure in the fuel tank to increase above atmospheric levels. In some vehicle the fuel tank may experience pressure 15-20 times greater than the atmospheric pressure.

Figure 2:
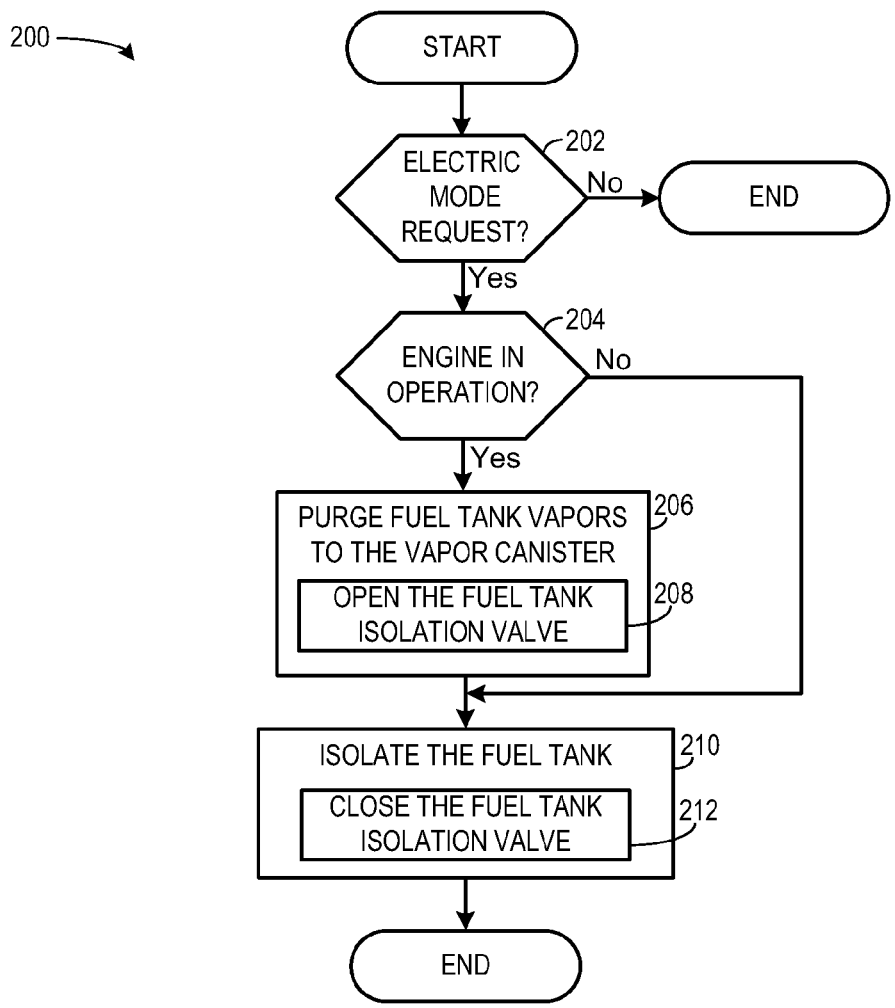
FIG. 2 shows a method for operation of a vehicle.

FIG. 2 shows a method 200 for operation of a vehicle. Method 200 may be performed via the systems and components described herein. However, in other examples method 200 may be implemented via other suitable systems and components.

At 202 the method includes determining if an electric mode has been requested. It will be appreciated that an electric mode may include a mode of vehicle operation in which an electric motor is providing motive power to the vehicle and the internal combustion engine is not in operation.

If it is determined that an electric mode request has not been made (NO at 202) the method ends. However, if it is determined that an electric mode request has been made (YES at 202) the method proceeds to 204 where the method includes determining if the engine is in operation. If the engine is in operation (YES at 204) the method includes at 206 purging fuel tank vapors to the vapor canister. In some examples, purging fuel tank vapors to the vapor canister may include at 208 opening the fuel tank isolation valve. However, it will be appreciated that in other examples, other valves may be operated to purge fuel tank vapors to the vapor canister.

Next at 210 the method includes isolating the fuel tank. In some examples isolating the fuel tank may include at 212 closing the fuel tank isolation valve. However it will be appreciated that in other embodiments alternate valves may be operated to isolate the fuel tank. However, if it is determined that the engine is not in operation (NO at 204) the method proceeds to 210. After 210 method 200 ends or alternatively, in other embodiments, returns to the start.

Method 200 may decrease evaporative emission from a hybrid type vehicle via selectively transferring vapors in the fuel tank to the vapor canister during engine operation and sealing the fuel tank and vapor canister while the vehicle is utilizing the electric motor for motive power. The duration that the fuel tank remains sealed may be greater in an electric vehicle utilizing method 200 when compared to a vehicle relying solely on an internal combustion engine for motive power.

Figure 3:
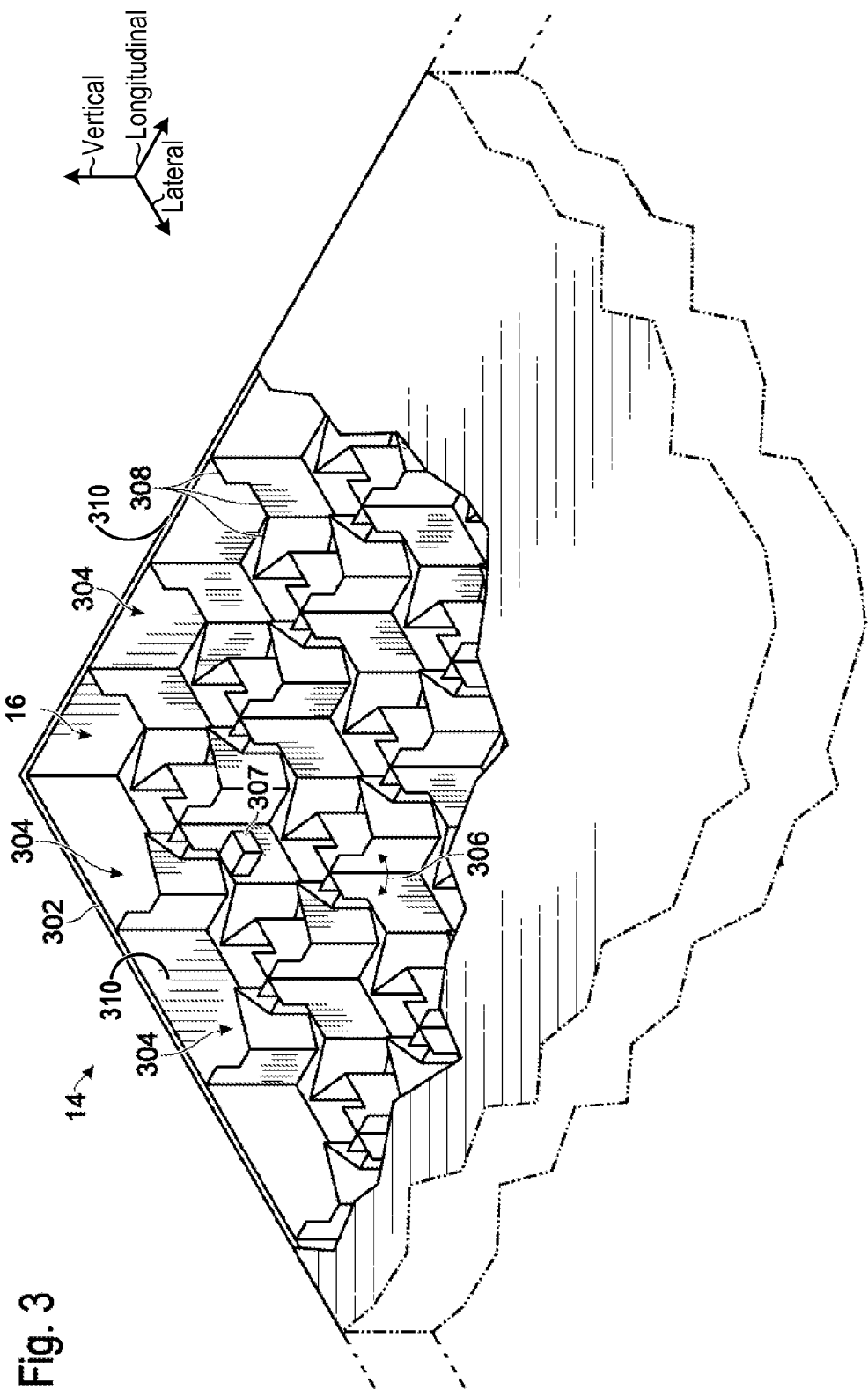
FIG. 3 shows an illustration of a distensible fuel tank including a lattice structure drawn approximately to scale.

FIG. 3 shows an illustration of distensible fuel tank 14. Fuel tank 14 may include a housing 302 enclosing a lattice structure 16 for providing controlled support to the fuel tank. The lattice structure may substantially span a portion of an interior of the fuel tank defined by the housing. In the depicted embodiment, a section of the housing has been removed to reveal the interior of the fuel tank and the internal lattice structure. However, it will be appreciated that the housing does in fact enclose the lattice structure. Housing 302 may be constructed out of a material that expands and contracts during operation of the vehicle. For example, housing 302 may be constructed out of a polymeric material, such as a high density polyethylene (HDPE), a metal, or a combination thereof. Additionally, the lattice structure may be constructed out of a suitable material such as a polymeric material, a metal, or a combination thereof.

The lattice structure may include a plurality of intersecting wall members 304. In some examples, the wall members may be conjoined. However, in other examples, the wall members may be attached in another suitable manner. In the depicted embodiment, angle 306 formed by the intersection of the wall member is substantially perpendicular. In this way, multi-axial loading of the lattice structure may be equally distributed. In one example, the intersection may include two pairs of identical supplementary angles. A sub assembly 307 may be coupled to one or more of wall members 304. The subassembly may be a sensor, an internal mounted fuel or vapor line, etc.

Each wall member may include a plurality of panels 308 arranged in a repeating pattern. In the depicted embodiment the sides of the panels are planar. However in other embodiments the sides of the panels may have another suitable shape. For example, the panels may be curved. Further, in the depicted embodiment wall members 304 are positioned substantially perpendicular to housing walls 310. In this way, the wall members provide structural support to the fuel tank housing.

Although a rectangular fuel tank is illustrated it will be appreciated that fuel tanks having alternate geometries may be used in other embodiments such as saddle shaped fuel tank. Furthermore, it will be appreciated that fuel tank may be positioned in a number of orientations in the vehicle.

Figure 4:
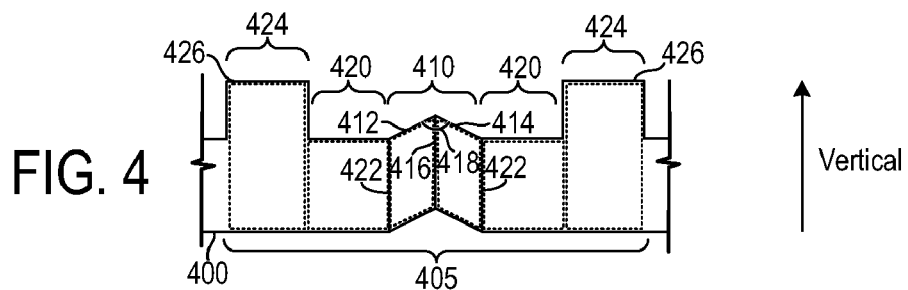
FIG. 4 shows a side view of a portion of a wall member included in the lattice structure shown in FIG. 3.

FIG. 4 shows a side view of a portion of an example wall member 400. Wall member 400 may be one of wall members 304 shown in FIG. 3. Wall member 440 includes a compliance panel 410 having a first section 412 and a second section 414 configured to fold about a crease line 416. The intersection of the first and second panels forms an angle 418. It will be appreciated that angle 418 may be altered when forced is applied to the compliance panel. In other words, the wall members may expand and contract when external forces are applied to the wall members via the fuel tank housing to thereby flex. It will be appreciated that the compliance panel may be elastic, thereby providing a resistance to the expansion and contraction of the fuel tank housing.

Figure 5:
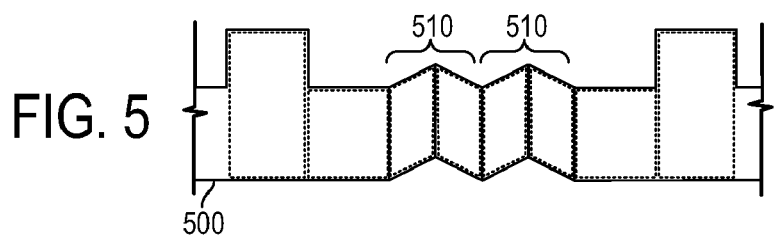
FIG. 5 shows another embodiment of a portion wall member.

In the embodiment shown in FIG. 5, the compliance panels 510 included in wall member 500 may include two or more crease lines forming a multi-crease (e.g., accordion) configuration. The multi-crease configuration may be used to create space for additional wall members in the lattice structure.

Returning to FIG. 4, structural panels 420 are also included in wall member 400. The structural panel provides structural support. The intersection of the compliance panels and the structural panels may define a crease line 422. It will be appreciated that when force is applied to the structural panel the angle formed by the intersection of the compliance panel and the structural panel may be altered.

Wall member 400 further includes intersection panels 424. The intersection panel includes an edge 426 coupled (e.g., welded or adhesively bonded) to the fuel tank housing. In the depicted embodiment edge 426 of the intersection panel is straight. However, in other embodiments the edge may be curved.

Continuing with FIG. 4 as shown, the vertical height of the intersection panels is greater than the vertical height of the compliance panels and structural panels. The variation in height allows fuel to more easily travel to different portions of the fuel tank. However in other examples the height of the compliance, structural, and intersection panels may be equivalent.

As shown, the panels are arranged in the order of a structural panel, an intersection panel, a structural panel, and a compliance panel, and so on. However, it will be appreciated that alternate patterns are possible. For example, the panels may be arranged in the order of a structural panel, a compliance panel, compliance panel, an intersection panel, and so on, as shown in FIG. 5. Furthermore, the structural and intersection panels, 420 and 424 respectively, are co-planar, where the structural and intersection panels are positioned in a common plane.

The expansion and contraction of the fuel tank housing 302, shown in FIG. 3, may be based on the temperature of the fuel tank as well as the venting schema of the fuel tank. For example, the fuel tank may expand when the fuel tank is sealed and the temperature is increased and contract when the temperature decreases and/or when the fuel tank is not sealed (e.g., isolated). As previously discussed, the fuel tank may be isolated when the fuel delivery system is in an inactive state and the energy conversion device is providing mechanical energy to the transmission. Furthermore, the expansion and contraction of the fuel tank may also depend on the material properties of the fuel tank housing as well as the geometry of the housing.

Various parameter of lattice structure 16 shown in FIG. 3 may be tuned to reduce the likelihood of degradation and possible failure of the fuel tank housing due to the deflection of the housing. In other words, various aspects of the lattice structure may be modified to meet the desired design specifications of the fuel tank based on the material property of the fuel tank housing, the housing design, the venting schema of the fuel tank, and anticipated fuel tank temperatures. The tuned parameters may include the flexibility of the compliance panels, the height of the intersection panels, the thickness of the panels, the angle formed by the intersecting wall members, the number of compliance panels, the moment of inertia of the panels, and the spacing of the wall members (e.g., the number of the lateral and longitudinal wall member). In this way, the lattice structure can accommodate a desired amount of flexing of the fuel tank housing while at the same time providing structural support to reduce the likelihood of housing degradation (e.g., rupturing, cracking, etc.).

Figure 6:
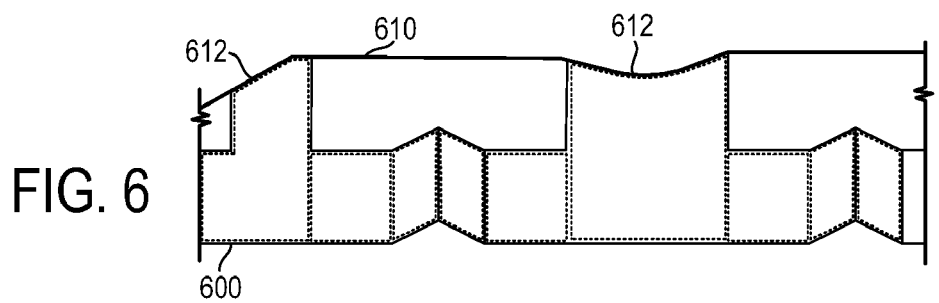
FIG. 6 shows another embodiment of a portion of a wall member.

It will be appreciated that the lattice structure may be integrated into a variety of fuel tanks such as asymmetrical fuel tanks and/or fuel tanks having curved surfaces. The height of the panels in the wall members, the length of the wall members, and shape of the edges of the wall members that are coupled or adjacent to the fuel tank housing may be designed to conform to the contours of the fuel tank housing. For example as shown in FIG. 6 edges 612 of the intersection panels may be altered to conform to uneven housing surface 610 of wall member 600. It will be appreciated that the edges of the structural panels, compliance panels, etc., may be altered to conform to the contours of the fuel tank housing in other embodiments.

The lattice structure described above provides increased strength to the fuel tank as well as a desired amount of flexibility, permitting the housing to expand and contract. Furthermore, the lattice structure may decrease rapid scattered movement of fuel (e.g., "splashing") within the fuel tank which may degrade pump operation, in the example where the lattice is exposed to fuel held in the tank.

It will be appreciated that the configurations and/or approaches described herein are exemplary in nature, and that these specific embodiments or examples are not to be considered in a limiting sense, because numerous variations are possible. The subject matter of the present disclosure includes all novel and nonobvious combinations and subcombinations of the various features, functions, acts, and/or properties disclosed herein, as well as any and all equivalents thereof.

The invention claimed is:

1. A distensible fuel tank included in a vehicle comprising:
a housing enclosing a lattice structure substantially spanning a portion of an interior defined by the housing, the lattice structure including a plurality of intersecting wall members, each wall member including a plurality of panels, the plurality of panels including a compliance panel having a first and second section configured to fold about a crease line.

2. The distensible fuel tank of claim 1, wherein the plurality of panels are arranged in a repeating pattern.

3. The distensible fuel tank of claim 1, wherein each wall member includes an intersection panel having at least a portion of the panel coupled to the housing.

4. The distensible fuel tank of claim 3, wherein each wall member includes a structural panel positioned in a common plane with the intersection panel.

5. The distensible fuel tank of claim 3, wherein the heights of the intersection panels are greater than the heights of the structural or compliance panels.

6. The distensible fuel tank of claim 1, further comprising an internal sub-assembly coupled to the lattice structure.

7. The distensible fuel tank of claim 1, wherein the wall members are conjoined at their intersections.

8. The distensible fuel tank of claim 1, wherein the housing is constructed out of a polymeric material.

9. The distensible fuel tank of claim 1, wherein the vehicle is a hybrid electric vehicle including an internal combustion engine and an electric motor configured to provide motive power to the vehicle, wherein the internal combustion engine is fluidly coupled to the fuel tank.

10. The distensible fuel tank of claim 1, wherein the first and second sections of the compliance panel have planar sides.

11. The distensible fuel tank of claim 1, wherein the sides of the panels are planar.

12. The distensible fuel tank of claim 1, wherein the wall members intersect at a substantially perpendicular angle.

13. A distensible fuel tank for a vehicle comprising:
   a housing enclosing a lattice structure substantially spanning a portion of an interior defined by the housing, the lattice structure comprising;
   a plurality of intersecting and conjoined wall members, each wall member including a plurality of panels arranged in a repeating pattern having a varying height, the panels including a compliance panel having a first section and a second section configured to fold about a crease line and an intersection panel coupled to the housing and arranged in a common plane with a structural panel.

14. The distensible fuel tank of claim 13, wherein the vehicle includes an electric motor configured to provide motive power.

15. The distensible fuel tank of claim 13, wherein the wall members intersect at a substantially perpendicular angle.

16. The distensible fuel tank of claim 13, wherein the panels have planar sides.

17. A lattice structure for providing controlled support to a distensible fuel tank comprising:
   at least two intersecting wall members, each wall member including a plurality of panels arranged in a repeating pattern having varying heights, the plurality of panels having planar sides including a compliance panel having a first and second section configured to fold about a crease line, an intersection panel, and a structural panel, the intersection panel and the structural panel in each wall member being co-planar.

18. The lattice structure of claim 17, wherein the wall members intersect at a substantially perpendicular angle.

19. The lattice structure of claim 17, wherein a portion of each intersection panel is coupled to a housing of the distensible fuel tank.

20. The lattice structure of claim 17, wherein the heights of the intersection panels are greater than the heights of the structural or compliance panels.

* * * * *